(12) United States Patent
Clark et al.

(10) Patent No.: US 7,685,509 B1
(45) Date of Patent: Mar. 23, 2010

(54) DIVIDING A FORM FIELD INTO AREAS ASSOCIATED WITH SEPARATE ENTRY FILTERS

(75) Inventors: David Clark, Woodloes Park (GB); Ian Holt, Telford (GB); Andrew John Smith, Wellesbourne (GB)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 09/193,605

(22) Filed: Nov. 17, 1998

(30) Foreign Application Priority Data

Jul. 30, 1998 (GB) .................................. 9816476.7

(51) Int. Cl.
G06F 17/20 (2006.01)
(52) U.S. Cl. ........................ 715/224; 715/217; 715/225; 715/226
(58) Field of Classification Search ......... 707/505–508, 707/529–530; 715/505–508, 529–530, 221–226, 715/227–228, 212, 217
See application file for complete search history.

(56) References Cited

U.S. PATENT DOCUMENTS

| | | | | |
|---|---|---|---|---|
| 5,247,611 A | | 9/1993 | Norden-Paul et al. ........ | 707/504 |
| 5,845,300 A | * | 12/1998 | Comer et al. ................ | 707/508 |
| 5,900,004 A | | 5/1999 | Gipson ........................ | 716/530 |
| 5,999,937 A | * | 12/1999 | Ellard .......................... | 707/101 |
| 6,052,693 A | * | 4/2000 | Smith et al. .................. | 707/102 |
| 6,085,206 A | | 7/2000 | Domini et al. ............... | 707/533 |
| 6,167,523 A | * | 12/2000 | Strong ......................... | 707/507 |
| 6,208,339 B1 | * | 3/2001 | Atlas et al. ................... | 345/708 |
| 6,367,068 B1 | | 4/2002 | Vaidyanathan et al. ....... | 717/143 |

FOREIGN PATENT DOCUMENTS

EP 435 478 A2 7/1991

OTHER PUBLICATIONS

Lemay et al, JavaScript, Sams.net, 1996, p. 135-137.*
Lemay et al Laura Lemay's Web Workshop JavaScript, hereinafter Lemay (1996, p. 132-134).*
QUE Development Group, "Using Paradox 5 For Windows" Special Edition, QUE, 1994, pp. 77-83.*
Currid et al, Data Based Advisor, vol. 7, No. 7, Jul. 1989, "From here to there (and back again!)", pp. 104-108, Dialog.
Cornell, Gary et al., Core Java, 2nd Edition, 1997 Sun Microsystems, Inc., SunSoft Press, pp. 234-240.
Moseley, Lonnie E. et al., Mastering Office 97 Professional Edition, 2nd Edition, Jan. 1997 SYBEX Inc., pp. 583-589.

(Continued)

*Primary Examiner*—C B Paula
(74) *Attorney, Agent, or Firm*—Ido Tuchman; Anne V. Dougherty (57) ABSTRACT

In many situations, the objective of data entry is to obtain a complex or structured value. This has traditionally been accomplished by providing a discrete entry field for each element of data entry. By extending the notion of an entry filter, and introducing the notion of a discrete editable element within an entry field, it is possible to apply a structure to that entry field. A management component enables one or more entry filters to be associated in turn with each editable element, and ensures that the entry filters are applied correctly to the appropriate elements.

20 Claims, 9 Drawing Sheets

OTHER PUBLICATIONS

Kasten, Eric, HTML Forms, Aug. 1995 Linux Journal, vol. 1995, Issue 16es, pp. 1-5.

QuickDict Spelling Dictionary Version 1.3, Lee Services, Feb. 22, 1997, application screenshots and help files, pp. 1-13.

* cited by examiner

DIVIDING A FORM FIELD INTO AREAS ASSOCIATED WITH SEPARATE ENTRY FILTERS

FIELD OF THE INVENTION

The present invention relates to structured entry filter component of a user interface for a computer system.

BACKGROUND OF THE INVENTION

A common requirement in a computer system user interface is entering information. This is typically done using entry fields. For text entry, typical characteristics of entry fields include a means for showing the insertion position, a means for moving the insertion position, and a means for entering text at the insertion position. Further characteristics may include the ability to select a section of the entered text, and operate on the selected text in a variety of ways.

There are certain constraints that can be enforced in order to get different types of data from the user. An example of this is ensuring the correct capitalisation of a title. Another example is the restriction of entry to numeric characters only.

Where complex data entry is required, such as with date or time values, it is helpful to consider the structure of the value. For example, a short UK date format may be considered as three distinct editable numeric elements with two non-editable separators between them. A common way of achieving this is to use a series of separate entry fields with each field forming one of the editable sections of the overall structure. This approach has several disadvantages. The user sees disjoint entry fields with fixed boundaries, rather than a single integrated entry field containing the required structure. Also, it is difficult to obtain the whole value with such a solution, as it is composed of many separate fields.

DISCLOSURE OF THE INVENTION

Accordingly, the present invention provides a set of components for facilitating user input in an application, said set of components comprising: an entry field component being instantiable to receive user input, to store said user input, to change status responsive to said user input, to generate one or more events indicative of said status and being adapted to allow instances of the entry field component to add one or more entry filter components as listeners to the or each event; one or more entry filter components being instantiable to respond to one or more of the or each events, instances of the or each entry filter being adapted to read said user input and to modify said user input according to one or more conditions associated with the or each entry filter component; a structured entry filter manager component being instantiable to receive a pattern dividing an instance of an entry field into a plurality of editable areas, at least one of said editable areas having an associated instance of entry filter, instances of said filter manager being adapted to add themselves as listeners to events generated by an entry field instance and to relay said events to any entry filter instances associated with an editable area of said entry field to which said event applies; and a structured entry filter component being instantiable to determine said pattern according to a required format and to pass said pattern to said structured entry filter manager.

In a further aspect the invention provides a structured entry filter manager component for facilitating user input in an application, said component being cooperable with an entry field component being instantiable to receive user input, to store said user input, to change status responsive to said user input, to generate one or more events indicative of said status and being adapted to allow instances of the entry field component to add one or more entry filter components as listeners to the or each event; and an entry filter component being instantiable to respond to one or more of the or each events, instances of the or each entry filter being adapted to read said user input and to modify said user input according to one or more conditions associated with the or each entry filter component; said structured entry filter manager component being instantiable to receive a pattern dividing an instance of an entry field into a plurality of editable areas, at least one of said editable areas having an associated instance of entry filter, instances of said filter manager being adapted to add themselves as listeners to events generated by an entry field instance and to relay said events to any entry filter instances associated with an editable area of said entry field to which said event applies.

The present invention provides a mechanism for constructing an entry filter which encapsulates a complex structure by allowing it to be considered as distinct editable elements with non-editable separators between them. Each such element can be treated as an entry field in its own right, and can have one or more entry filters associated with it to obtain the desired behaviour. In this way, the logic for applying simple constraints can be re-used and combined to achieve sophisticated results.

The invention enables an entry field to be split up into distinct editable elements, with different sets of rules for each element, while the end user perceives one integrated entry field. In the context of the present invention, an entry field is anything allowing input from a plurality of input devices, and doesn't necessarily have to be textual. However, the invention will be described in terms of a preferred embodiment which performs text filtering.

The embodiment includes a component that manages collections of editable elements of a complex structure. The editable element component adheres to an encapsulated definition of an entry field, and additionally defines a subset of the input area. The manager component adheres to an encapsulated definition of an entry filter, and acts as an interface between an entry field and an associated collection of editable elements.

The manager component responds to notifications of user input events from the associated entry field by determining the appropriate editable element to which the notification applies, and causing the editable element to issue the corresponding notification in its turn. The element manager also handles queries and modifications of characteristics of the editable elements by mapping them onto the associated entry field. The element manager also responds to changes to the content of the associated entry field by dynamically adjusting the subset of the input area defined by each editable element, and ensuring that any non-editable element separators are preserved, so as to maintain the required structure.

In this way, each editable element is able to represent a subset of the input area while adhering to the encapsulated definition of an entry field. Also, a collection of editable elements together with their associated element manager are able to represent a complex structure while adhering to the encapsulated definition of an entry filter. One important aspect of the resulting structured entry filter is that one or more entry filters can themselves be associated with the individual editable elements.

DESCRIPTION OF THE PREFERRED EMBODIMENTS

The present invention according to a preferred embodiment is implemented as a software component for controlling the operation of a computer system on which it is run. The software component may be modified to run on many different types of computer and operating system platforms. The computer program code according to the preferred embodiment is written in the Java programming language (Java is a trademark of Sun Microsystems Inc.). As is known in the art, the Java language provides for the abstract definition of required behaviours by a construct known as an interface. Concrete implementation of these behaviours can then be provided by classes which implement these interfaces.

In general terms, entry fields expose methods which allow their text to be queried, set and modified, for example, getText, setText, append, insert. Entry fields also generate events, for example, keyPressed/or textValueCompleted. (In the present embodiment, these events are in fact method calls issued by the entry field to listeners which the entry field knows implement such methods.) Entry filters operate with entry fields which allow for the addition of listeners which implement methods for one or more entry field events and, according to the constraints they apply to the text entered in the entry field, the filters determine the final value of the entry field. It is possible to associate one or more entry filters with an entry field, so that the desired composite behaviour can be obtained.

Examples of such filters are an AutoCompleteTextFilter, NumericTextFilter and TitleTextFilter. The functionality of these filters is well known and computer users will be used to filling in entry fields having such functionality in on-screen forms. However, this functionality is commonly implemented as an integral part of an entry field, rather than as a plug-in behaviour as in the case of the present invention. This plug-in behaviour not only enables the same entry field implementation to be used for many individual types of behaviour, but also allows more than one entry filter to be applied to a field to generate complex behaviour. For example, an AutoCompleteTextFilter and a TitleTextFilter can be applied to an entry field so that when a candidate is automatically returned by the AutoComplete filter to complete the field, it is then capitalised in a manner determined by the TitleTextFilter.

Figure 1:
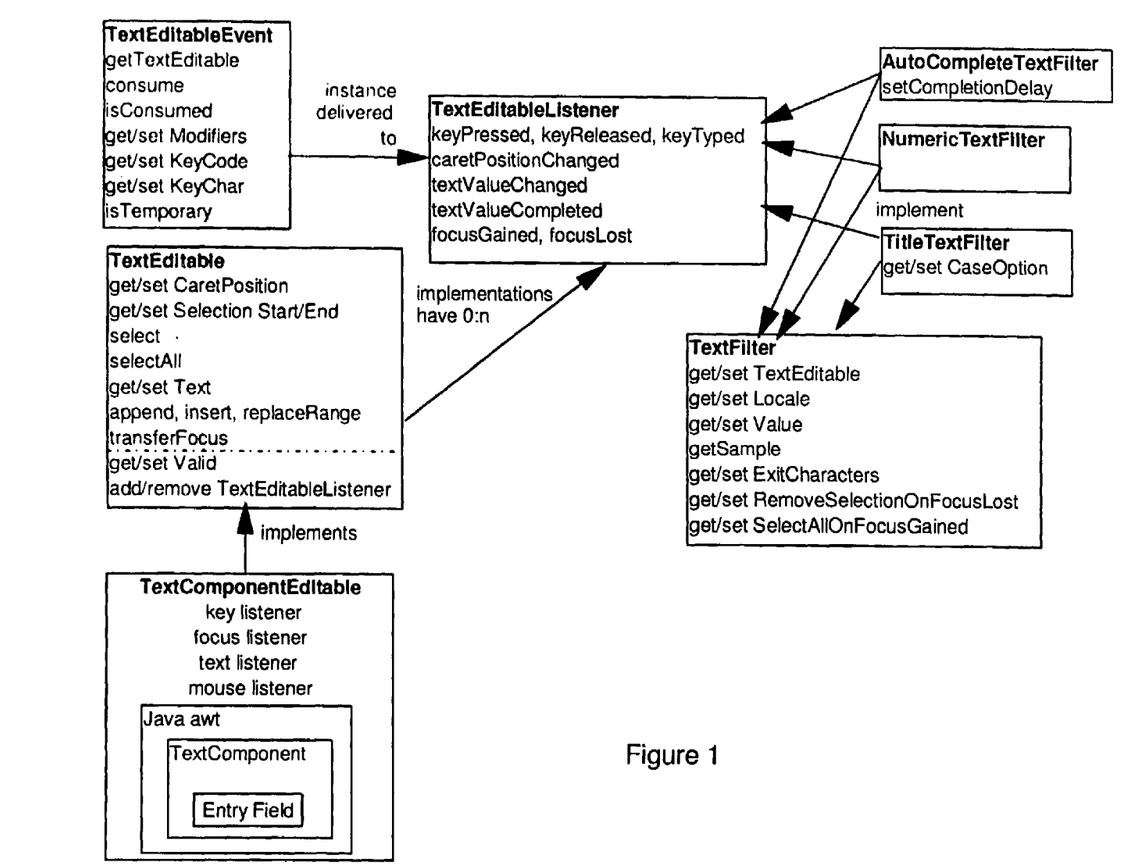
FIG. 1 is a schematic diagram of the classes required to implement entry filters.

Referring now to FIG. 1, a number of classes are shown, illustrating the operation of entry filters:

TextEditable

An encapsulated definition of the services expected of a text entry field is embodied in a TextEditable interface. Each characteristic required of a text entry field is thus supported by one or more methods defined by this interface. As is known in the art, the Java Abstract windowing Toolkit (AWT) includes an entry field component within the java.awt.TextComponent class. Many of the methods defined by the TextEditable interface are also found on the java.awt.TextComponent class. A concrete implementation of the TextEditable interface is implemented within the TextComponentEditable class which is a simple wrapper for java.awt.TextComponent. A separate implementation TextElementEditable, FIG. 3, allows filters to work with a sub-set of an editable area managed by a structured text filter according to the invention, whose operation will be explained later.

The TextEditable interface defines the following methods which, unless otherwise noted, correspond to the methods implemented by java.awt.TextComponent:

getCaretPosition and setCaretPosition allow the text insertion position to be queried and modified.

getSelectionStart, setSelectionStart, getSelectionEnd and setSelectionEnd allow the start and end positions of the currently selected text to be queried and modified individually.

select allows the start and end positions of the currently selected text to be modified together.

selectAll selects the entire text.

getText and setText allow the current text to be queried and modified.

append, insert and replaceRange allow the current text to be manipulated in various ways.

transferFocus allows user input focus to be transferred to the next available component.

getValid and setValid, not in TextComponent, control whether the current text is to be shown as valid according to any associated constraints.

addTextEditableListener and removeTextEditableListener, not in TextComponent, allow the addition and removal of filters which are listeners for TextEditable events. Such filters must implement a TextEditableListener interface, described below, which describes the events which may be generated by implementations of TextEditable.

TextEditableListener

This interface describes the events which may be generated by implementations of TextEditable. It defines the following methods:

keyPressed/, keyReleased and keyTyped allow keyboard events to be intercepted and any necessary actions to be taken. Using the methods on the TextEditableEvent class, described below, the details of the event may be modified, or the event suppressed.

caretPositionChanged is called when the text insertion point's position changes.

textValueChanged is called when the value in the text field changes.

textValueCompleted is called when the user has indicated that data entry is complete.

focusGained and focusLost are called when the text field gains or loses user input focus.

TextEditableEvent

An instance of TextEditableEvent is delivered to each of the methods on TextEditableListener. It provides information about the event, and a means of modifying or suppressing certain of those events. It defines the following methods:

getTextEditable returns a reference to the instance of TextEditable that generated the event.

consume allows the event to be suppressed. Subsequent listeners will still receive the event but can determine that it has been suppressed.

isConsumed returns whether or not the event has been suppressed.

getModifiers and setModifiers allow modifiers to be queried and modified. For keyboard events, these modifiers indicate which of the keyboard augmentation keys was active when the event was generated, as defined in the java.awt.event.KeyEvent class.

getKeyCode and setKeyCode allow key codes to be queried and modified. For keyboard events, these key codes indicate exactly which key generated the event, as defined in the java.awt.event.KeyEvent class.

getKeyChar and setKeyChar allow key characters to be queried and modified. For keyboard events, these key characters indicate which character, if any, corresponds to the key which generated the event.

isTemporary allows the focus transfer state to be queried, to determine whether it has permanently or temporarily transferred. Temporary focus loss occurs when the window that contains the text field loses focus.

TextFilter

An encapsulated definition of the services provided by a text entry filter is embodied in the TextFilter interface. Each characteristic of a text entry filter is thus supported by one or more methods defined by this interface. TitleTextFilter, AutoCompleteTextFilter and NumericTextFilter are concrete implementations of the TextFilter interface.

Figure 2:
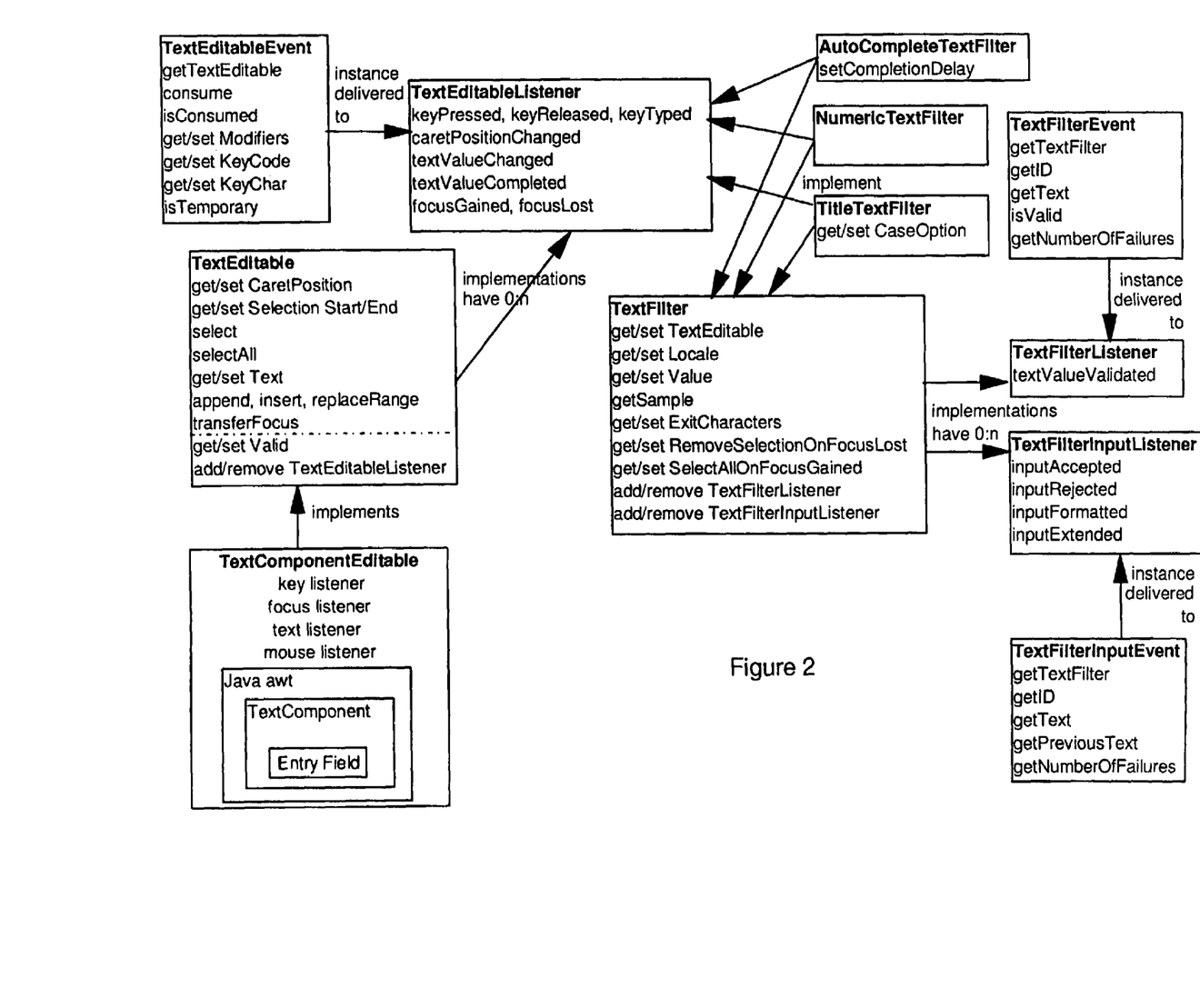
FIG. 2 extends the diagram of FIG. 1 to illustrate the classes required to enable external objects to communicate with the entry filters of FIG. 1.

The TextFilter interface defines the following methods:

setTextEditable allows the text filter to be associated with a single implementation of TextEditable. One or more text filters may be associated with a single implementation of TextEditable, although when more than one text filter is associated with a TextEditable it is important to ensure that the sets of constraints do not adversely interfere with each other.

getTextEditable returns a reference to the currently associated implementation of TextEditable.

getLocale and setLocale allow the java.util.Locale currently used by the text filter to be queried and modified. Implementations of the TextFilter interface can use this java.util.Locale to assist with the provision of internationalisation support.

getValue and setValue allow the text in the associated TextEditable to be queried and modified using a Java class that is appropriate to the function of the text filter.

getSample returns a sample of valid entry for this text filter. This embodiment is able to use this to provide user assistance for data entry.

getExitCharacters and setExitCharacters allow the characters which will trigger focus transfer out of the associated TextEditable to be queried and modified.

getRemoveSelectionOnFocusLost, setRemoveSelectionOnFocusLost, getSelectAllOnFocusGained and setSelectAllOnFocusGained allow the focus behaviour of the filter to be queried and modified.

addTextFilterListener, removeTextFilterListener, addTextFilterInputListener and removeTextFilterInputListener, FIG. 2, allow the addition and removal of listeners for TextFilter events. It will be seen that other objects in an application may want to benefit from the validation provided by text filters. In a database application, it may not be satisfactory for an object using information input by a user to rely upon the conventional textValueCompleted event to allow the object to receive the completed contents of an entry field, as this may anticipate the contents of the entry field being updated with a modified value reflecting the proper behaviour of the text filter.

Thus, in a preferred embodiment, FIG. 2, two further interfaces TextFilterListener and TextFilterInputListener interfaces are provided. These interfaces described in more detail later, define events which may be generated by implementations of TextFilter, for example, textValueValidated tells a listener that the current value in the entry field, which may have been modified by the filter after completion by the user, is correct.

TextComponentEditable

This class is an example of a concrete implementation of the TextEditable interface. It enables a java.awt.TextComponent to be used with the other classes in this embodiment. It primarily maps the methods defined by TextEditable to the equivalent methods on the java.awt.TextComponent class.

getValid and setValid have no equivalent on the java.awt.TextComponent class, and so are implemented by storing a Boolean data member.

TextComponentEditable, via the java.awt.TextComponent it encapsulates, listens to user generated events and as such acts as a key listener, a focus listener, and a text listener, in order that it can in turn issue the required TextEditable events, at the appropriate times. It is also a mouse listener, in order that it can monitor the caret position of the java.awt.TextComponent and issue the required caretPositionChanged events at the appropriate times. The textValueCompleted event is issued whenever the enter key is pressed or the java.awt.TextComponent loses user input focus.

In use, an application instantiates a TextComponentEditable and calls the setTextEditable method on each of the previously instantiated filters. setTextEditable in turn calls addTextEditableListener on the TextComponentEditable to add the appropriate filter, for example TitleTextFilter, to the entry field. The filters then listen to any subsequent events and apply the appropriate constraints to the text that may have been entered.

Filters such as NumericTextFilter will be inclined to wait until the textValueCompleted event before deciding whether a value entered is valid or needs modification, as such their implementation of events such as keyPressed/, keyReleased or keyTyped will be minimal. AutoCompleteTextFilter on the other hand listens for every character entered to determine if there is a match in its list of candidates for the text entered.

TextFilterListener

This interface describes the events which may be generated by implementations of TextFilter. It defines the following method:

textValueValidated is called whenever the text filter has attempted to establish whether or not the current text in the associated TextEditable is valid. This normally occurs when the associated TextEditable indicates that data entry is complete by issuing the textValueCompleted event.

TextFilterEvent

An instance of TextFilterEvent is delivered to the method on TextFilterListener. It provides information about the event. It defines the following methods:

getTextFilter returns a reference to the instance of TextFilter that generated the event.

getID returns the unique identifier of the event.

getText returns the text which was in the associated TextEditable when the event was generated.

isValid returns whether or not the text in the associated TextEditable was found to be valid when the event was generated.

getNumberOfFailures returns the number of consecutive validation failures since the last successful validation.

TextFilterInputListener

A more detailed interface than TextFilterListener, this interface describes further events which may be generated by implementations of TextFilter. It defines the following methods:

inputAccepted is called when text entry has conformed to the constraints imposed by the text filter.

inputRejected is called when text entry has not conformed to the constraints imposed by the text filter.

inputFormatted is called when text entry is successfully modified to conform to a format required by the text filter.

inputExtended is called when the text entry is automatically added to by the text filter.

TextFilterInputEvent

Similar to TextFilterEvent, an instance of TextFilterInputEvent is delivered to each of the methods on TextFilterInputListener, and provides information about the event. It defines the following methods:

getTextFilter returns a reference to the instance of TextFilter that generated the event.

getID returns the unique identifier of the event.

getText returns the text which was placed into the associated TextEditable as the event was generated.

getPreviousText returns the text which was in the associated TextEditable before the event was generated. For inputFormatted and inputExtended events, the value returned will be different from that returned by getText.

getNumberOfFailures returns the number of input rejections since the last input that was accepted.

It will be seen that the invention could also be implemented with a single class combining TextFilterEvent and TextFilterInputEvent and/or another class combining TextFilterListener and TextFilterInputListener, although it is felt that developers employing the invention may prefer the added granularity provided by separate classes.

TitleTextFilter

Figure 5A:
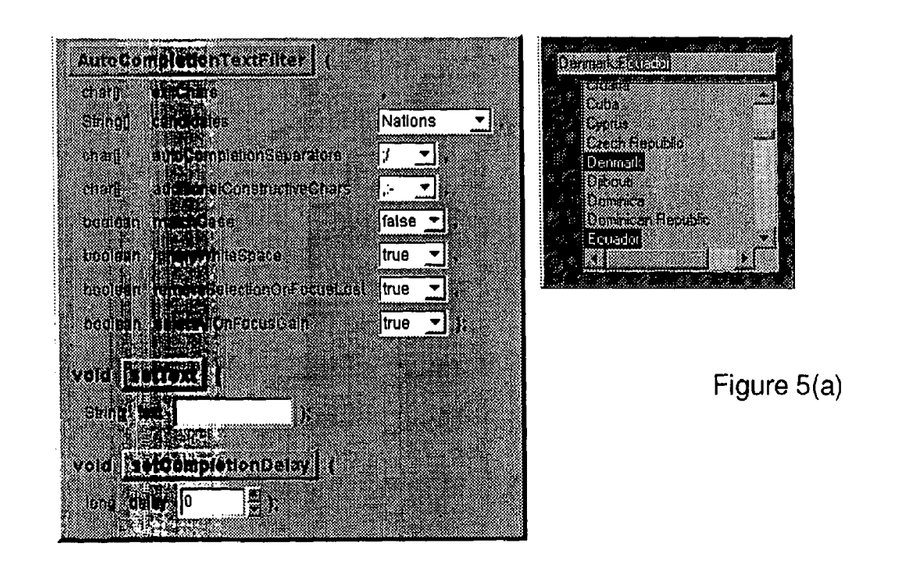
FIGS. 5(a) to (e) illustrate some entry fields operating with entry filters and structured entry filters according to the invention.
Figure 5B:
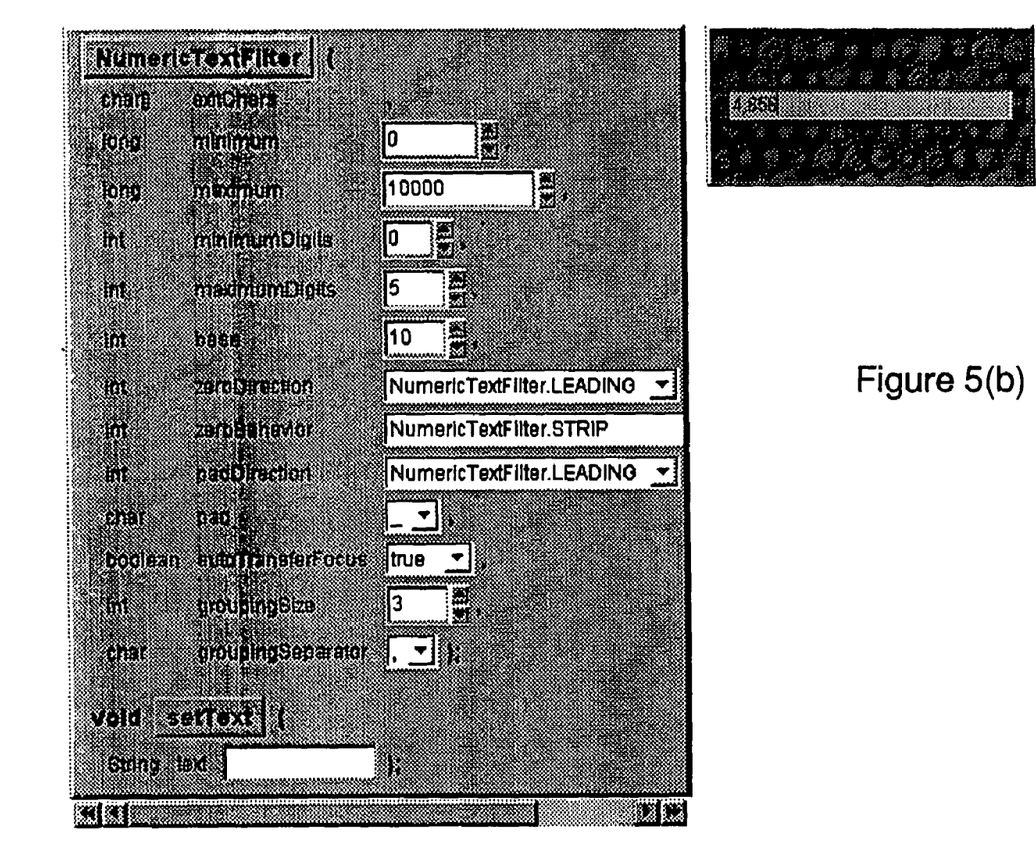
Figure 5C:
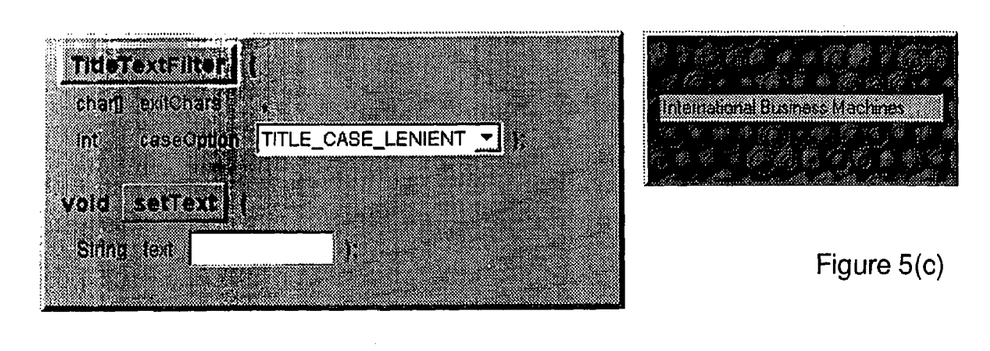

This class is an example of a concrete implementation of the TextFilter interface, an example of which is shown on the right of FIG. 5(c) while the main interface parameters are shown on the left of FIG. 5(c). For more information on demonstrating user interface component operation in this fashion see British Patent Application No. 9713616.2 or U.S. application Ser. No. 08/037,605.

The purpose of TitleTextFilter is to ensure that text entered conforms to one of a set of defined capitalization schemes. In order to be able to intercept events from the associated TextEditable, it also implements the TextEditableListener interface.

TitletextFilter provides the following additional methods:

getCaseOption and setCaseOption allow the capitalization scheme that is to be used by the filter to be queried and modified.

TitleTextFilter implements the methods of the TextFilter interface as follows:

setTextEditable adds the TitleTextFilter as a TextEditableListener to the supplied TextEditable, in order that the TextEditable events relevant to text capitalization are received. A reference to the supplied TextEditable is stored.

getTextEditable returns a reference to the currently associated TextEditable.

setLocale stores a reference to the supplied java.util.Locale. Locale services are used to perform text capitalization in the textValueChanged method described below.

getLocale returns a reference to the stored java.util.Locale.

getValue and setValue allow the current value to be queried and modified using the java.lang.String class. They are mapped directly to the getText and setText methods on the associated TextEditable.

getSample uses the currently selected capitalization scheme to return a sample of valid entry for this text filter.

setExitCharacters stores the supplied array of characters. These characters are used to trigger focus transfer in the keyPressed/method described below.

getExitCharacters returns the stored array of exit characters.

setRemoveSelectionOnFocusLost and setSelectAllOnFocusGained store the supplied Boolean values. These values are used in the focusLost and focusGained methods described below.

getRemoveSelectionOnFocusLost and getSelectAllOnFocusGained return the stored Boolean values.

addTextFilterListener and addTextFilterInputListener add the supplied listener to the appropriate collection of listeners. These collections of listeners are used to issue appropriate events in the textValueChanged, textValueCompleted, and keyTyped methods described below.

removeTextFilterListener and removeTextFilterInputListener remove the supplied listener from the appropriate collection of listeners.

TitleTextFilter implements the methods of the TextEditableListener interface as follows:

keyPressed matches the key character that generated the event against the stored array of exit characters. If a match is found then focus is transferred by calling the transferFocus method on the associated TextEditable.

keyTyped uses the services provided by the stored java.util.Locale to determine whether the key character that generated the event is the first character of a new word. This information, in conjunction with the current capitalization scheme, is used to determine the correct case for the character. If the correct case differs from that of the key character, the key character is modified by using the setKeyChar method on the supplied TextEditableEvent, and an inputFormatted event is issued to the collection of TextFilterInputListeners. Finally, an inputAccepted event is issued to the collection of TextFilterInputListeners.

textValueChanged uses the services provided by the stored java.util.Locale to correctly capitalise the current text in the associated TextEditable using the current capitalization scheme, and an inputFormatted event is issued to the collection of TextFilterInputListeners.

textValueCompleted issues a textValueValidated event to the collection of TextFilterListeners.

focusGained uses the stored Boolean value set by setSelectAllOnFocusGained to determine whether the text in the associated TextEditable is to be selected. If it is, the selectAll method on the associated TextEditable is called.

focusLost uses the stored Boolean value set by setRemoveSelectionOnFocusLost to determine whether the text in the associated TextEditable is to be de-selected. If it is, the select method on the associated TextEditable is called in such a way as to remove the current selection without moving the text insertion point.

keyReleased and caretPositionChanged have empty implementations, as these events are not relevant to text capitalization.

It will be seen that the implementation of TitleTextFilter does not affect the content of the information in the entry field, only its format. Other implementations of TextEditableListener, AutoCompleteTextFilter and NumericTextFilter shown in FIGS. 5(a) and 5(b) respectively, define assistance for or a number of constraints on the information entered.

AutoCompleteTextFilter, uses a supplied list of expected values to provide prompted entry. It may also be provided with a list of separators to enable the user to insert a list of entries in a single entry field. In the case of FIG. 5(a), this separator list comprises a semi-colon and a slash.

AutoCompleteTextFilter also provides the method setCompletionDelay, which allows other objects to specify the time in milliseconds after the last user input before auto-completion is applied.

NumericTextFilter on the other hand needs to be provided with minimum and maximum valid values, minimum and maximum lengths of numbers as well as formatting parameters. Unlike the other two filters NumericTextFilter does not need to expose any additional methods to other objects to allow it to be configured appropriately.

Still further variations of text filters are also possible. For example a check digit validation and/or generation filter could be generated for attachment to an entry field. Use of check digits is becoming more and more common to allow for validation of relatively long serial or application numbers. The check digit is usually calculated as a function of the individual digits of the serial number and added to the end of the number, sometimes after a full stop. For example, a UK patent application root number "9816476" is given a check digit "7" and the complete number is usually written "9816476.7". A check digit filter would need to have a number of properties. If it were not generic, then a grammar defining the function for calculating the check digit would need to be specified in a suitable manner. A property determining whether the filter would simply validate and entered check digit or whether it would complete a root number could also be made available, so that if a user stopped typing at the end of the root number or the full stop, the check digit would be calculated and inserted. In this case the input would always be valid. As with the AutoCompleteTextFilter a setCompletionDelay method would also need to be exposed. It will be seen that it would be possible to combine such a filter with an AutoCompleteTextFilter so that a syntactically correct number could be checked against a database for semantic correctness, for example, to check if an application of that number has been filed.

Figure 3:
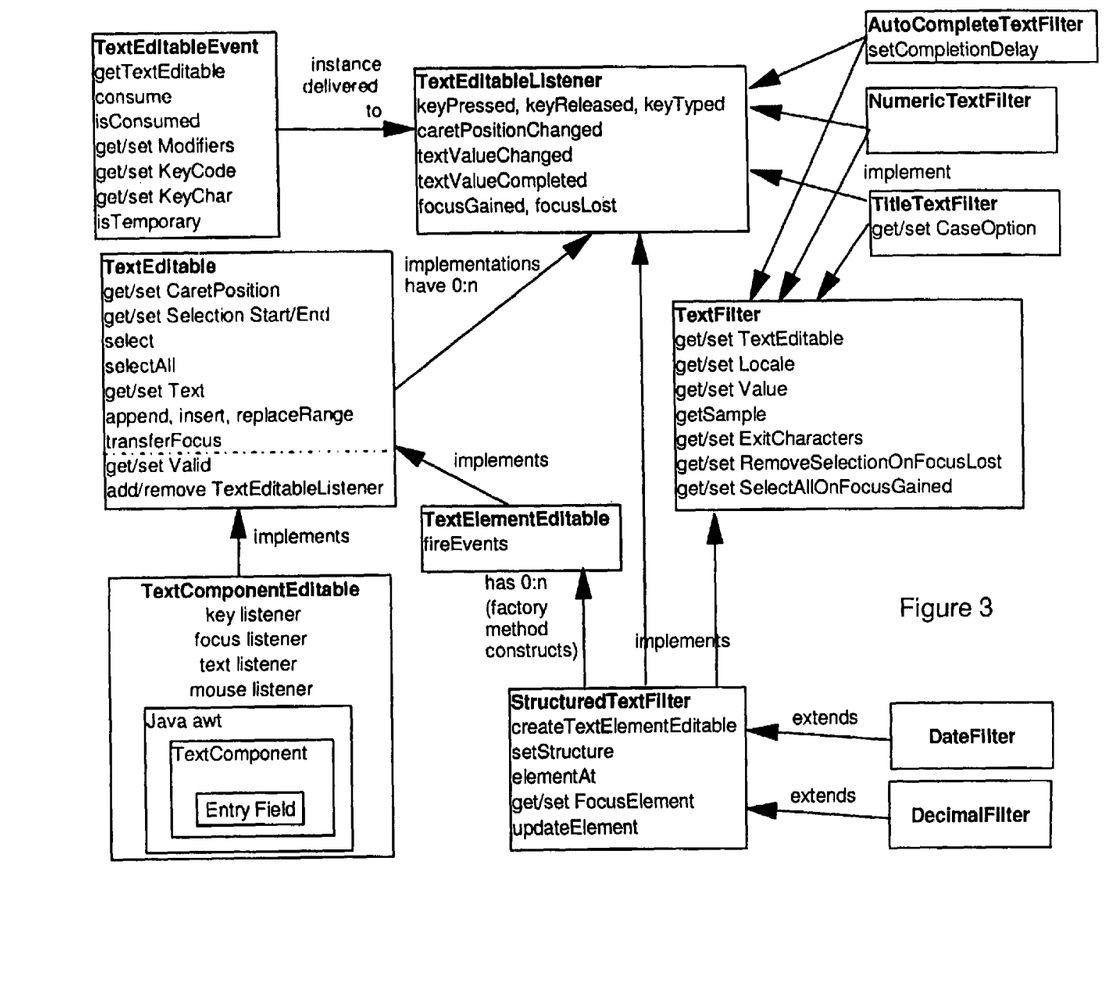
FIG. 3 illustrates the classes of FIG. 1 adapted to allow entry filters to work with a subset of an editable area managed by a structured entry filter according to the invention.
Figure 4:
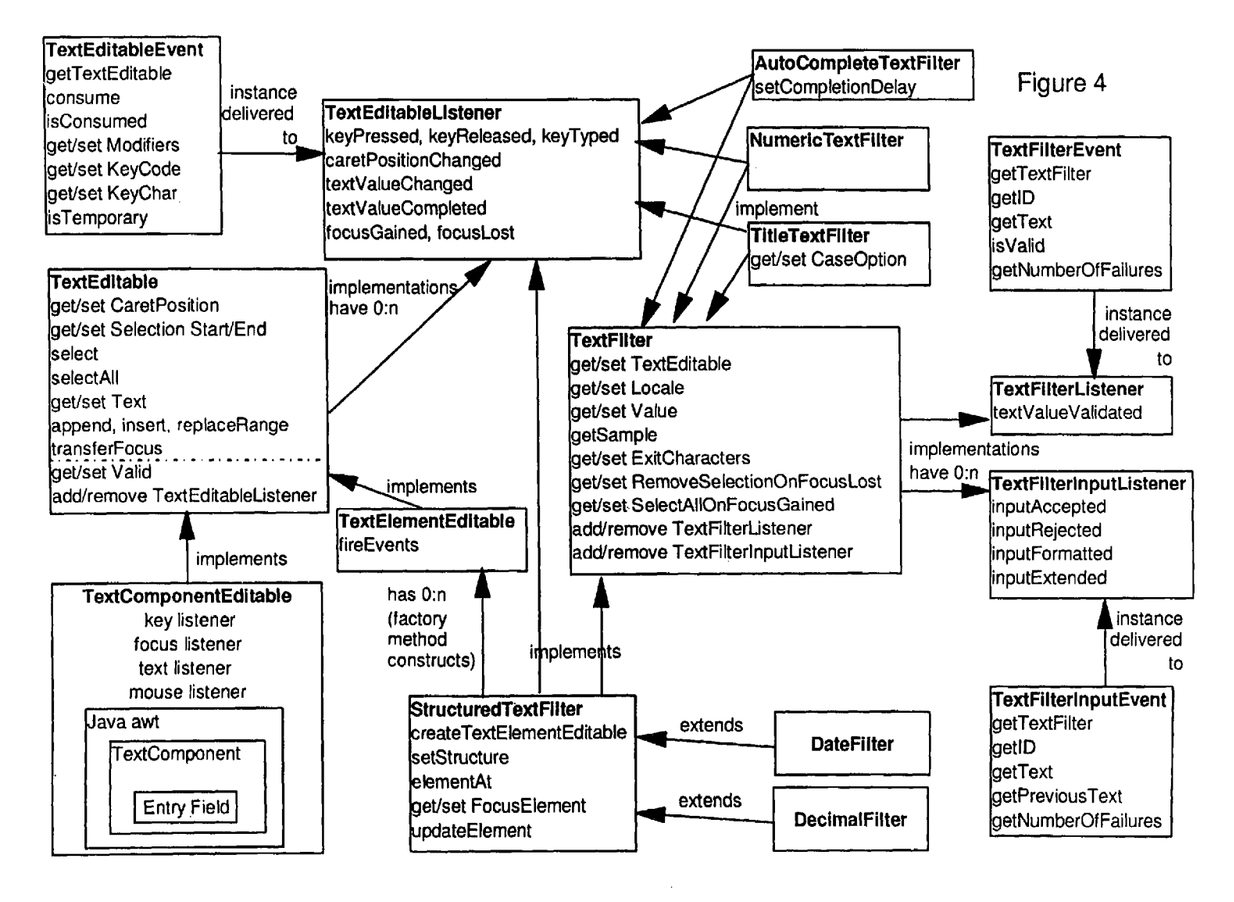
FIG. 4 extends the diagram of FIG. 3 to illustrate the classes required to enable external objects to communicate with both the entry filters and structured entry filters of FIG. 3.

According to the present invention, entry filters, described above, work with a sub-set of an editable area managed by a structured text filter, FIG. 3. Each subset of an editable area is implemented by a TextElementEditable class, which is an implementation of TextEditable, adapted to work within a structured entry field.

TextElementEditable

TextElementEditable is a concrete implementation of the TextEditable interface. It is used in conjunction with StructuredTextFilter, described below, and represents an editable element in a complex structure. Instances of TextElementEditable are constructed by a factory method on StructuredTextFilter, and remain permanently linked to a single instance of StructuredTextFilter.

TextElementEditable stores the start position and the end position of the subset of the editable area which the element represents. It also stores the current text for this element, and a reference to the StructuredTextFilter to which it is linked.

This class implements the methods of the TextEditable interface as follows:

addTextEditableListener adds the supplied listener to the collection of listeners. This collection of listeners is used to issue appropriate events in the methods described below.

removeTextEditableListener removes the supplied listener from the collection of listeners.

setText updates the stored text for this element, and then calls an updateElement method on StructuredTextFilter, described below. It then issues a textValueChanged event to the collection of TextEditableListeners.

append, insert and replaceRange manipulate the current text in various ways, and call the setText method with the result.

getCaretPosition, setCaretPosition, getSelectionStart, setSelectionStart, getSelectionEnd, setSelectionEnd and select call the corresponding methods on the TextEditable associated with the StructuredTextFilter, adjusting the parameters and return values by using the stored start and end positions.

selectAll calls the corresponding method on the TextEditable associated with the StructuredTextFilter.

transferFocus attempts to locate the next element in the collection of active elements for the StructuredTextFilter and set the text insertion point position of the associated TextEditable to the start position of that element, thus transferring focus to the next available element. If no next element is found, the transferFocus method on the associated TextEditable is called, thus transferring focus to the next available component.

StructuredTextFilter

This class is a concrete implementation of the TextFilter interface. It is used in conjunction with one or more TextElementEditables to provide a structured text entry mechanism according to the invention. In order to be able to intercept events from the associated TextEditable, it also implements the TextEditableListener interface.

This class provides the following additional methods:

createTextElementEditable returns a new instance of TextElementEditable linked to the StructuredTextFilter.

setStructure defines the structure of editable and non-editable elements that will be managed by the StructuredTextFilter. This method accepts a text string to be used as the non-editable prefix, an array of TextElementEditables that will act as the editable elements of the structure, and an array of text strings to be used as the non-editable suffixes which follow each editable element. The length of the prefix, the length of the current text for each element, and the length of each suffix are used to compute the start position and the end position stored by each element.

elementAt returns the TextElementEditable which contains the supplied position. A TextElementEditable contains all positions from its own start position to the start position of the next TextElementEditable.

setFocusElement sets the text insertion point position of the associated TextEditable to the start position of the supplied TextElementEditable.

getFocusElement returns the TextElementEditable which contains the text insertion point of the associated TextEditable, or null if the text insertion point is within the non-editable prefix area.

updateElement uses the current text for the supplied TextElementEditable to re-compute the stored end position of the element, and also the stored start position and end position for each subsequent element. It then applies the element text to the associated TextEditable by calling its replaceRange method.

This class implements the methods of the TextFilter interface as follows:

setTextEditable adds the StructuredTextFilter as a TextEditableListener to the supplied TextEditable, in order that the TextEditable events relevant to structured text entry are received. A reference to the supplied TextEditable is stored.

getTextEditable returns a reference to the currently associated TextEditable.

setLocale stores a reference to the supplied java.util.Locale.

getLocale returns a reference to the stored java.util.Locale.

getValue and setValue allow the current value to be queried and modified using the java.lang.String class. They are mapped directly to the getText and setText methods on the associated TextEditable, in the expectation that this method will be overridden by classes extending StructuredTextFilter.

getSample returns an empty string in the expectation that this method will be overridden by classes extending StructuredTextFilter.

setExitCharacters stores the supplied array of characters. These characters are used to trigger focus transfer in the keyPressed method described below.

getExitCharacters returns the stored array of exit characters.

setRemoveSelectionOnFocusLost and setSelectAllOnFocusGained store the supplied Boolean values. These values are used in the focusLost and focusGained methods described below.

getRemoveSelectionOnFocusLost and getSelectAllOnFocusGained return the stored Boolean values.

addTextFilterListener and addTextFilterInputListener add the supplied listener to the appropriate collection of listeners. These collections of listeners are used to issue appropriate events in the textValueChanged, textValueCompleted and keyTyped methods described below.

removeTextFilterListener and removeTextFilterInputListener remove the supplied listener from the appropriate collection of listeners.

StructuredTextFilter implements the methods of the TextEditableListener interface as follows:

keyPressed/matches the key character that generated the event against the stored array of exit characters. If a match is found then focus is transferred by calling the transferFocus method on the associated TextEditable. If no match is found, this method causes the TextElementEditable returned by the getFocusElement method to issue a keyPressed/event to its collection of TextEditableListeners.

keyTyped and keyReleased cause the TextElementEditable returned by the getFocusElement method to issue a keyTyped or keyReleased event to its collection of TextEditableListeners.

textValueChanged parses the new text in the associated TextEditable, using the prefix and the suffixes as delimiters, to obtain the new text for each editable element. If the prefix or any of the suffixes does not appear fully in the new text, then they are restored by building the complete value using the prefix, the suffixes and the current text for each editable element, and applying that complete value to the associated TextEditable by calling the setText method. In this way the preservation of the non-editable prefix and all of the non-editable suffixes is ensured.

textValueCompleted issues a textValueValidated event to the collection of TextFilterListeners.

focusGained uses the stored Boolean value set by setSelectAllOnFocusGained to determine whether the text in the associated TextEditable is to be selected. If it is, the selectAll method on the associated TextEditable is called. If not, the setFocusElement method is called supplying the first TextElementEditable as the parameter.

focusLost uses the stored Boolean value set by setRemoveSelectionOnFocusLost to determine whether the text in the associated TextEditable is to be de-selected. If it is, the select method on the associated TextEditable is called in such a way as to remove the current selection without moving the text insertion point. Finally, it causes the TextElementEditable returned by the getFocusElement method to issue a focusLost event to its collection of TextEditableListeners.

caretPositionChanged determines whether the new text insertion point is contained within a different TextElementEditable to that which contains the previous text insertion point. If so, it causes the TextElementEditable which contains the previous text insertion point to issue a focusLost event to its collection of TextEditableListeners, and then causes the TextElementEditable which contains the new text insertion point to issue a focusGained event to its collection of TextEditableListeners.

DateFilter

Figure 5D:
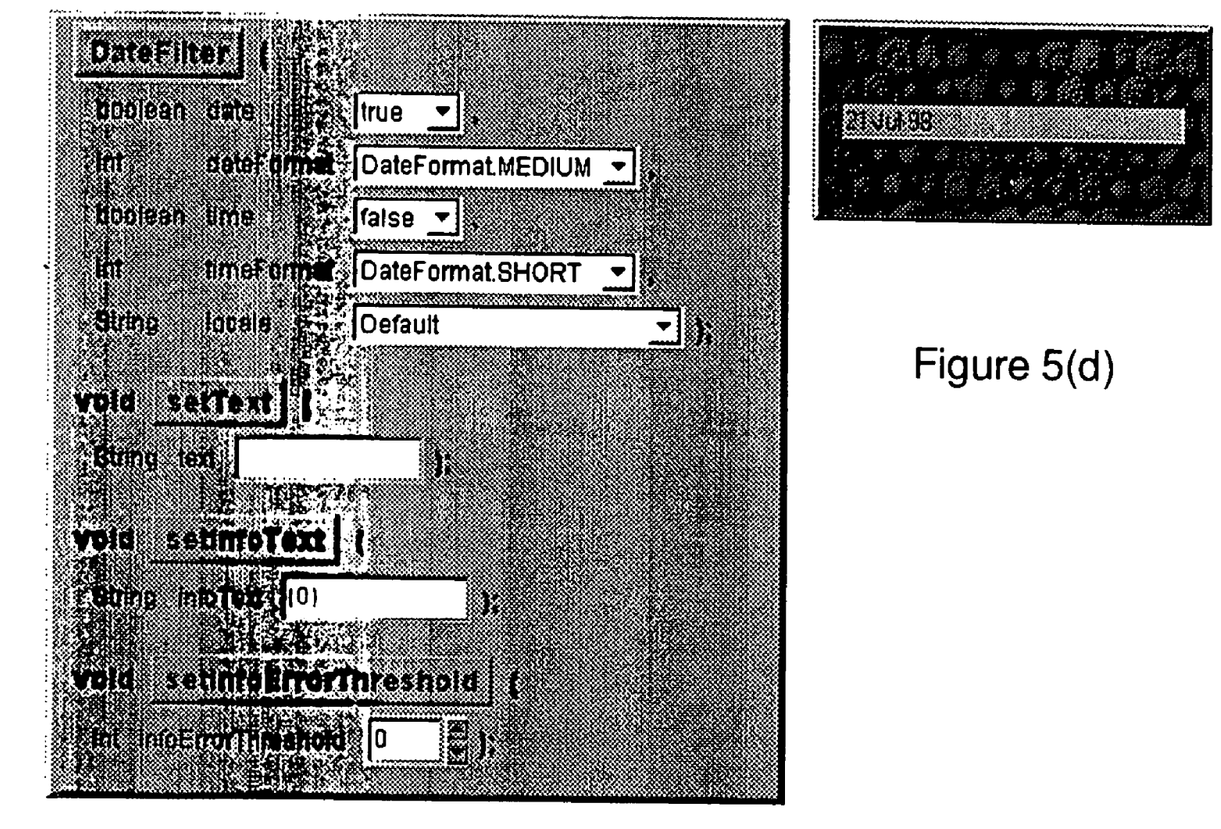

This class is an example of an extension to the StructuredTextFilter class. Its purpose is to create and maintain a structure of editable elements and non-editable areas which together form a filter for date and/or time entry. An example is shown in FIG. 5(d). It generally makes use of two of the concrete implementations of TextFilter, namely NumericTextFilter and AutoCompleteTextFilter described above.

NumericTextFilter, as described above, restricts input to numeric characters, and can also be configured with range and formatting information. It is used for numeric elements of the date format, such as day number, month number, year, hour, minute, and second.

AutoCompleteTextFilter is used for elements of the date format which have a small set of possible values, such as day name, month name, era, and time zone.

The structure for a DateFilter is specified by a pattern composed of masking characters as defined by the java.text.SimpleDateFormat class. Alternatively, the structure can be specified using one of the predefined formats defined by the java.text.DateFormat class. In this case, Locale services are used to convert each of these predefined formats to a pattern.

The pattern is used to determine the non-editable prefix, the requisite number of TextElementEditables, the appropriate text filters to be associated with each TextElementEditable, and the non-editable suffixes. Each required TextElementEditable is created using the createTextElementEditable method, and the appropriate text filters are then created and associated with it. The prefix, the TextElementEditables and the suffixes are then supplied to the setStructure method of StructuredTextFilter.

DateFilter also provides the following additional methods:

setDateUsed and setTimeUsed store the supplied Boolean values. These values control the inclusion of the date and time parts of the structure.

getDateUsed and getTimeUsed return the stored Boolean values.

setDateFormatStyle and setTimeFormatStyle store the supplied predefined formats defined by java.text.DateFormat. These values control the format of the date and time parts of the structure.

getDateFormatStyle and getTimeFormatStyle return the stored predefined formats.

setPattern allows a custom pattern to be specified.

getPattern returns the current pattern.

DateFilter also overrides the following methods of StructuredTextFilter:

setLocale stores a reference to the supplied java.util.Locale. Locale services are used to apply the correct formatting characteristics. Changing the Locale may cause the entire structure to be recreated.

getLocale returns a reference to the stored java.util.Locale.

setValue allows the current value to be modified using the java.util.Date class. Locale services are used to convert the supplied java.util.Date value to a java.lang.String value, which is passed to the setText method on the associated TextEditable.

getValue uses Locale services to return a java.util.Date object representing the current value.

getSample uses Locale services to return a java.lang.String representing the current date formatted according to the current pattern.

Figure 6:
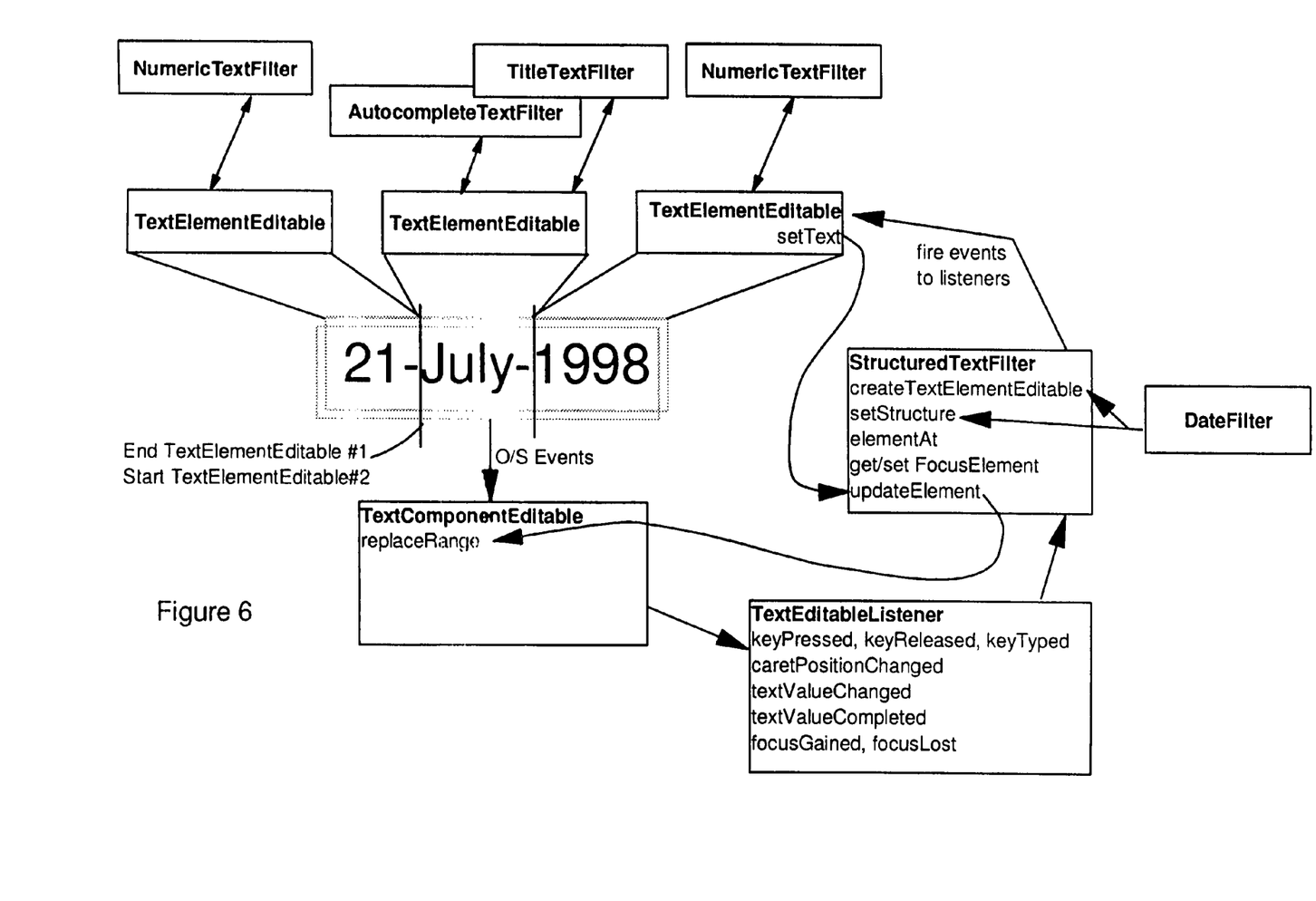
FIG. 6 is a block diagram showing the components operating in an example of a structured entry filter according to the invention.

FIG. 6 shows an instantiation of structured text filter managing a date entry field. The date field in this case has a pattern comprising no prefix, two TextElementEditables each with a suffix of "-" and a third TextElementEditable without a suffix.

The instance of the date entry field instantiates the TextElementEditables and passes the prefix, the TextElementEditables and the suffixes to an instance of StructuredTextFilter which manages user interaction with an instance of TextComponentEditable which is used to display the entry field on a screen and to listen to user generated events relating to the entry field. The instance of date entry field also instantiates and adds the appropriate filters to the respective TextElementEditables. The first having an associated NumericTextFilter with a minimum of 1 and a maximum of 31, the second with an associated AutoCompleteTextFilter having a list of candidates being the names of the months, and the third having an associated NumericTextFilter with a minimum and maximum determining the first of last year accepted. Also shown is a TitleTextFilter associated with the second element. This enables different capitalisation from that of entries in the list of candidates to be enforced.

When an event, for example a key press, occurs, TextComponentEditable issues the keyPressed/event to its listeners. One of these listeners is the instance of StructuredTextFilter. StructuredTextFilter then needs to determine which of the TextElementEditables has user input in focus which it does by calling getFocusElement.

StructuredTextFilter then causes the TextElementEditable returned to issue a keyPressed/event to each of its listeners. This is made possible because each TextElementEditable also implements a list of methods corresponding to the events it can generate. For example, a method fireKeyPressed is available to enable objects to cause a TextElementEditable to call keyPressed on each of its listeners. These listeners are the appropriate text filters for the element.

Depending on the event and the text filter, the text filter may need to change the contents of the entry field. It does this by calling setText on its associated TextEditable—this will be the appropriate TextElementEditable. The TextElementEditable in turn calls updateElement on the StructuredTextFilter. updateElement then calls replaceRange on the associated TextEditable to substitute the value for the old value. The associated TextEditable will be the TextComponentEditable with which the user is interacting. updateElement then adjusts the start and end positions for each TextElementEditable before finishing.

The instance of DateFilter can determine the value of the entire entry field at any time by calling getValue on StructuredTextFilter which is in turn mapped onto getText on the associated TextEditable, which is the TextComponentEditable.

Figure 5E:
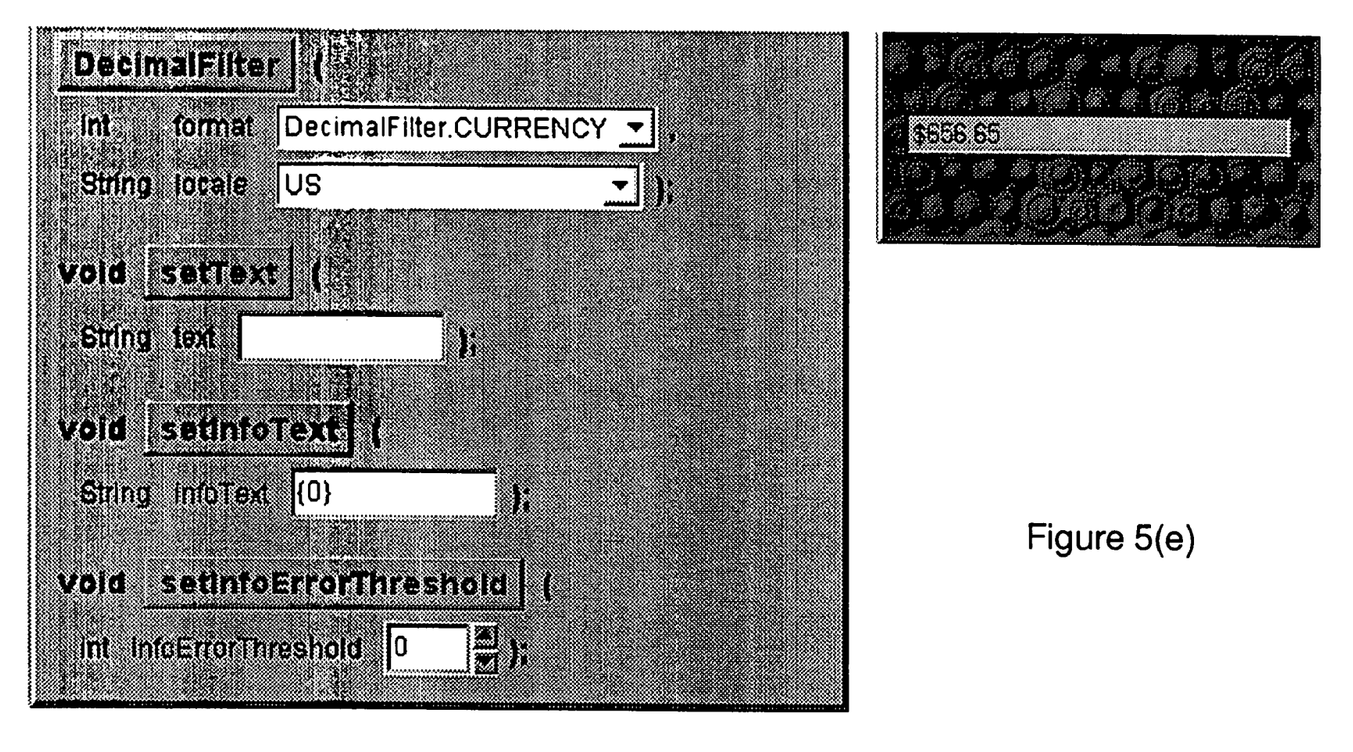

A further example of a structured text filter, DecimalFilter, is shown in FIG. 5(e). DecimalFilter extends the StructuredTextFilter class to provide currency, percentage, and number entry behaviour. DecimalFilter constrains the user's input to be a number which can admit negative values and/or a decimal point, currency symbols, percentage, etc.

All decimal number formats provided by Java Development Kit 1.1 internationalisation can be supported. The required format may be specified, or the locale default used.

Since these formats vary from country to country, the expected format is determined by the default or specified locale. DecimalFilter determines the type and order of the elements, as well as the appropriate element prefix and suffixes. Numeric text filters are applied to the elements representing the integer and fraction parts of the number. An appropriate prefix and/or suffixes are set to represent the currency symbol(s), percent symbol(s), decimal separator(s), and negative symbol(s). Locale services are used to obtain these symbols, and their correct positions.

For example, -123.45 as a currency in a US English locale would look like this: ($123.45). This can be considered as two elements: the first element uses a numeric text filter, and has a suffix set to the decimal separator for the locale; the second element uses a numeric text filter constrained to two digits, and has a suffix of ")". The "(" and the currency symbol are combined to form the prefix.

It will be seen that, while the present embodiment is described in terms of Java, the invention is applicable to components written in other languages. For example, the components could also be written as a set of ActiveX Controls possibly for use by a visual builder such as Microsoft Visual Studio '97. Such controls can be used to build an application in a similar manner to that for Java without departing from the scope of the invention.

It should also be noted that for simplicity and clarity, the description has in many places described the operation of the invention in terms of the names of classes themselves. It will of course be apparent to those skilled in the art, that it is in fact instances of these classes that operate at run-time, with those instances in general being given different names to those of the classes of which they are instances. This convention should not, however, detract from the overall level of the disclosure.

The invention claimed is:

1. A user interface for a computer system, the user interface comprising:
   an entry field configured to receive user input, said entry field including a final value and is divided into a plurality of editable areas;
   a first entry filter configured to constrain said final value at said entry field to a first set of valid entries during input editing; and
   a second entry filter configured to constrain said final value at said entry field to a second set of valid entries during input editing, the second set of valid entries being different than the first set of valid entries;
   wherein a first editable area of the entry field is associated with the first entry filter and is not associated with the second entry filter, and a second editable area of the entry field is associated with the second entry filter and is not associated with the first entry filter.

2. The user interface of claim 1, wherein said first entry filter is configured to modify said user input according to one or more conditions associated with said first entry filter during input editing.

3. The user interface of claim 1, wherein said entry field is configured to generate an event each time said user input changes and wherein said first entry filter is a prompted entry filter, said prompted entry filter having an associated list of candidates and being adapted to respond to said user input change event by comparing said user input to entries in their associated list of candidates and, responsive to said user input matching an entry in their associated list of candidates, modifying said final value to match said entry.

4. The user interface of claim 3, wherein said prompted entry filter includes a time delay characteristic determining a length of time after a last user input change event before said user input is compared to entries in their associated list of candidates.

5. The user interface of claim 1, wherein said first entry filter is a numeric filter, said numeric filter having characteristics determining a range of said user input and being adapted to compare said user input to said characteristics and, responsive to said user input lying outside the range determined by said characteristics, said first entry filter modifying said final value to lie within said range.

6. The user interface of claim 1, wherein said first entry filter is a title text filter, said title text filter having a characteristic determining the character case of said user input and being adapted to modify said final value to conform to the character case.

7. The user interface of claim 1, wherein said entry field includes a value to be used as the non-editable prefix and an array of values to be used as non-editable suffixes within each editable area of the entry field.

8. The user interface of claim 1, wherein said first entry filter is a Date Filter, said Date Filter configured to store a date format pattern.

9. The user interface of claim 1, wherein said first entry filter is a Decimal Filter, said Decimal Filter being instantiable to store a decimal number format pattern.

10. The user interface of claim 1, wherein said first entry filter and said second entry filter are interchangeable and cooperable such that said final value can be constrained by a combination of both said first entry filter and said second entry filter.

11. A method for formatting user data at a computer system, the method comprising:
    receiving user input at an entry field, said entry field including a final value and is divided into a plurality of editable areas;
    constraining said final value at said entry field to a first set of valid entries during input editing using a first entry filter; and
    constraining said final value at said entry field to a second set of valid entries during input editing using a second entry filter;
    wherein a first editable area of the entry field is associated with the first entry filter and is not associated with the second entry filter, and a second editable area of the entry field is associated with the second entry filter and is not associated with the first entry filter.

12. The method of claim 11, wherein said first entry filter is configured to modify said user input according to one or more conditions associated with said first entry filter during input editing.

13. The method of claim 11, wherein said first entry filter and said second entry filter are interchangeable and cooperable such that said final value can be constrained by a combination of both said first entry filter and said second entry filter.

14. A computer program product embodied in a tangible media comprising:
    computer readable program codes coupled to the tangible media for formatting user data at a user interface, the computer readable program codes configured to cause the program to:
    receive user input at an entry field, said entry field including a final value and is divided into a plurality of editable areas;
    constrain said final value at said entry field to a first set of valid entries during input editing using a first entry filter; and
    constrain said final value at said entry field to a second set of valid entries during input editing using a second entry filter;
    wherein a first editable area of the entry field is associated with the first entry filter and is not associated with the second entry filter, and a second editable area of the entry field is associated with the second entry filter and is not associated with the first entry filter.

15. The computer program product of claim 14, wherein said first entry filter is configured to modify said user input according to one or more conditions associated with said first entry filter during input editing.

16. The computer program product of claim 14, wherein said entry field is configured to generate an event each time said user input changes and wherein said first entry filter is a prompted entry filter, said prompted entry filter having an associated list of candidates and being adapted to respond to said user input change event by comparing said user input to entries in their associated list of candidates and, responsive to said user input matching an entry in their associated list of candidates, modifying said final value to match said entry.

17. The computer program product of claim 16, wherein said prompted entry filter includes a time delay characteristic determining a length of time after a last user input change event before said user input is compared to entries in their associated list of candidates.

18. The computer program product of claim 14, wherein said first entry filter is a numeric filter, said numeric filter having characteristics determining a range of said user input and being adapted to compare said user input to said characteristics and, responsive to said user input lying outside the range determined by said characteristics, said first entry filter modifying said final value to lie within said range.

19. The computer program product of claim 14, wherein said first entry filter is a title text filter, said title text filter having a characteristic determining the character case of said user input and being adapted to modifying said final value to conform to the character case.

20. The computer program product of claim 14, wherein said first entry filter and said second entry filter are interchangeable and cooperable such that said final value can be constrained by a combination of both said first entry filter and said second entry filter.

* * * * *